(12) United States Patent
Nadot et al.

(10) Patent No.: US 8,884,199 B2
(45) Date of Patent: Nov. 11, 2014

(54) ELECTRIC POWER SYSTEM FOR ELECTRIC INDUCTION HEATING AND MELTING OF MATERIALS IN A SUSCEPTOR VESSEL

(75) Inventors: Vladimir V. Nadot, Sicklerville, NJ (US); Joseph T. Belsh, Mount Laurel, NJ (US); Mike Maochang Cao, Westampton, NJ (US); Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 1233 days.

(21) Appl. No.: 12/260,270

(22) Filed: Oct. 29, 2008

(65) Prior Publication Data

US 2009/0114640 A1    May 7, 2009

Related U.S. Application Data

(60) Provisional application No. 60/985,204, filed on Nov. 3, 2007.

(51) Int. Cl.
| | |
|---|---|
| *H05B 6/10* | (2006.01) |
| *F27D 27/00* | (2010.01) |
| *H05B 6/06* | (2006.01) |
| *H05B 6/36* | (2006.01) |
| *F27D 11/06* | (2006.01) |
| *F27D 99/00* | (2010.01) |

(52) U.S. Cl.
CPC ............... *H05B 6/067* (2013.01); *H05B 6/367* (2013.01); *F27D 11/06* (2013.01); *F27D 27/00* (2013.01); *H05B 2213/02* (2013.01); *F27D 2099/0015* (2013.01)

USPC ........... 219/634; 219/661; 219/663; 219/669; 373/146; 373/148; 373/138; 373/139; 373/144

(58) Field of Classification Search
CPC ................... F27B 14/061; F27D 11/06; F27D 2099/0015; F27D 27/00; H05B 2213/02; H05B 6/067; H05B 6/367
USPC ............... 373/138, 139, 144–152, 154, 7, 59; 219/634, 661, 663, 669
See application file for complete search history.

(56) References Cited

U.S. PATENT DOCUMENTS 1,943,802 A * 1/1934 Fitch ............................... 373/146
3,314,670 A * 4/1967 Kennedy ........................ 266/234

(Continued)

FOREIGN PATENT DOCUMENTS

| JP | 05-174963 A | 7/1993 |
| JP | 10-038467 A | 2/1998 |

(Continued)

*Primary Examiner* — Dana Ross
*Assistant Examiner* — Ket D Dang
(74) *Attorney, Agent, or Firm* — Philip O. Post

(57) ABSTRACT

Apparatus and process for heating and melting a material in a susceptor vessel are provided wherein phase synchronized ac voltage is supplied from a separate power source to each one of at least two induction coils in separate zones around the vessel. Power magnitude from each source to an induction coil is controlled by pulse width control of the source's output voltage. Output frequency from each source is either fixed or variable based upon the electrically conductive state of the material. Optional electromagnetic stirring is achieved by establishing a phase shift between the voltage outputs of the power supplies after the material in the susceptor vessel has melted.

12 Claims, 4 Drawing Sheets

(56) References Cited

U.S. PATENT DOCUMENTS

| | | | |
|---|---|---|---|
| 3,472,941 A * | 10/1969 | Floymayr | 373/146 |
| 3,657,506 A * | 4/1972 | Aronson | 219/671 |
| 3,972,704 A * | 8/1976 | Loxley et al. | 65/157 |
| 5,109,389 A * | 4/1992 | Stenzel | 373/156 |
| 5,250,777 A | 10/1993 | Fishman | |
| 5,394,432 A | 2/1995 | Fukuzawa et al. | |
| 6,121,592 A * | 9/2000 | Fishman et al. | 219/661 |
| 6,696,770 B2 * | 2/2004 | Nadot et al. | 307/17 |
| 7,085,305 B2 * | 8/2006 | Richardson | 373/151 |
| 7,197,061 B1 | 3/2007 | Fishman et al. | |
| 7,202,451 B2 | 4/2007 | Uchida et al. | |
| 7,582,851 B2 | 9/2009 | Fishman et al. | |
| 2003/0016724 A1 | 1/2003 | Fishman et al. | |
| 2003/0019868 A1 | 1/2003 | Beer | |
| 2004/0028111 A1 * | 2/2004 | Fishman et al. | 373/146 |
| 2006/0118549 A1 * | 6/2006 | Fishman et al. | 219/656 |
| 2006/0289494 A1 * | 12/2006 | Fishman et al. | 219/663 |

FOREIGN PATENT DOCUMENTS

| | | |
|---|---|---|
| JP | 2006-038351 A | 2/2006 |
| JP | 2006-344596 A | 12/2006 |
| WO | 2004004420 A1 | 1/2004 |

* cited by examiner

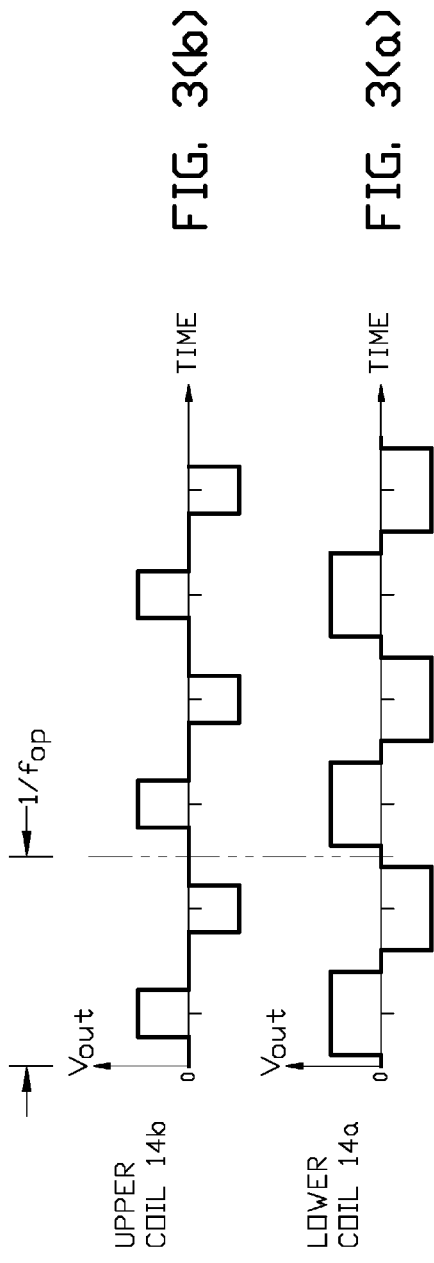
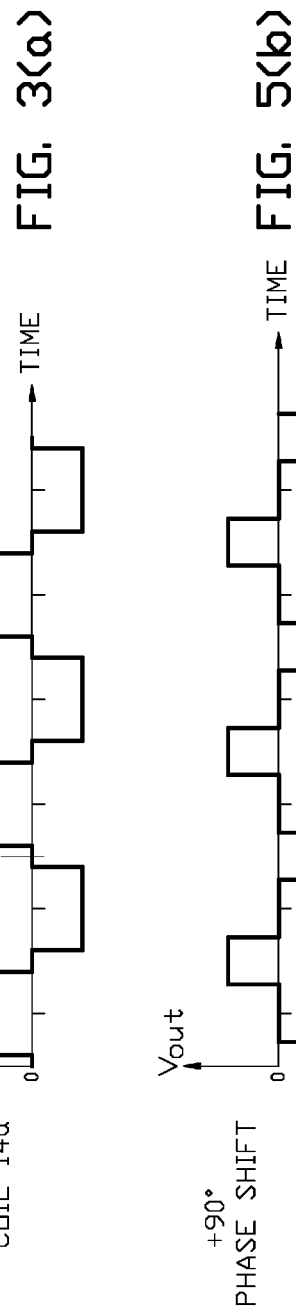

ELECTRIC POWER SYSTEM FOR ELECTRIC INDUCTION HEATING AND MELTING OF MATERIALS IN A SUSCEPTOR VESSEL

CROSS-REFERENCE TO RELATED APPLICATIONS

This application claims the benefit of U.S. Provisional Application No. 60/985,204, filed Nov. 3, 2007, hereby incorporated by reference in its entirety.

FIELD OF THE INVENTION

The present invention relates to electric power systems for electric induction heating and melting of materials in a susceptor vessel.

BACKGROUND OF THE INVENTION

A material that is non-electrically conductive in the solid state and electrically conductive in the molten state, such as silicon, can be heated in a susceptor vessel by placing the material in the susceptor vessel in the solid state and inductively heating the susceptor vessel. Heat transfer from the heated susceptor to the solid state material in the vessel will heat and begin to melt the material to its electrically conductive molten state. Electric induction power can then be used to inductively heat and melt the molten material.

In some arrangements two or more induction coils may surround different zones or sections of the exterior of the susceptor vessel with each of the induction coils connected to a separate alternating current power supply. Alternating current from each of the separate power supplies flowing through the induction coils generates the magnetic fields that inductively couple either with the susceptor or the material in the vessel. The generated magnetic fields also create a mutual inductance between the two or more induction coils. In some of these arrangements the outputs of the separate power supplies may be adversely affected by mutual inductance between the two or more induction coils particularly as the material in the vessel melts and the value of mutual inductance changes.

One object of the present invention is to provide an electric power system for electric induction heating and melting of a material in a susceptor vessel when two or more induction coils are provided in an arrangement resulting in mutual inductive coupling between the two or more coils.

SUMMARY OF THE INVENTION

In one aspect the present invention is apparatus for, and method of, providing electric power to two or more induction coils surrounding a susceptor vessel to inductively heat a material placed in the susceptor vessel when electric power is provided from a separate power supply to each induction coil.

In another aspect, the present invention is apparatus for, and method of, providing electric power to two or more induction coils surrounding a susceptor vessel to inductively heat a transition material that transitions from substantially non-electrically conductive in the solid state to electrically conductive in the molten state. Each induction coil is supplied power from a separate alternating current (ac) source. Output voltages from all power supplies to the two or more induction coils are phase synchronized. Output power magnitude from each power supply is independently adjusted as required to supply heat to the susceptor zone surrounded by each of the two or more induction coils. Optional phase shift adjustments of the output voltages of the power supplies can be provided after all transition material in the susceptor vessel has been melted to achieve unidirectional stirring of the molten material in the susceptor vessel. In some examples of the invention output frequency of all power supplies transitions from a susceptor inductive heating frequency to a molten material inductive heating frequency.

BRIEF DESCRIPTION OF THE DRAWINGS

The appended drawings, as briefly summarized below, are provided for exemplary understanding of the invention, and do not limit the invention as further set forth in this specification:

FIG. 3(a) and FIG. 3(b) are graphical illustrations of one type of pulse width control used to independently control the power level output from each power supply shown in FIG. 1.

FIG. 5(a) and FIG. 5(b) illustrate one example of minus and plus 90 degrees phase shifting of the voltage outputs, relative to the phase orientation shown in FIG. 3(a) and FIG. 3(b), of the power supplies shown in FIG. 1 to achieve electromagnetic stirring.

DETAILED DESCRIPTION OF THE INVENTION

Figure 1:
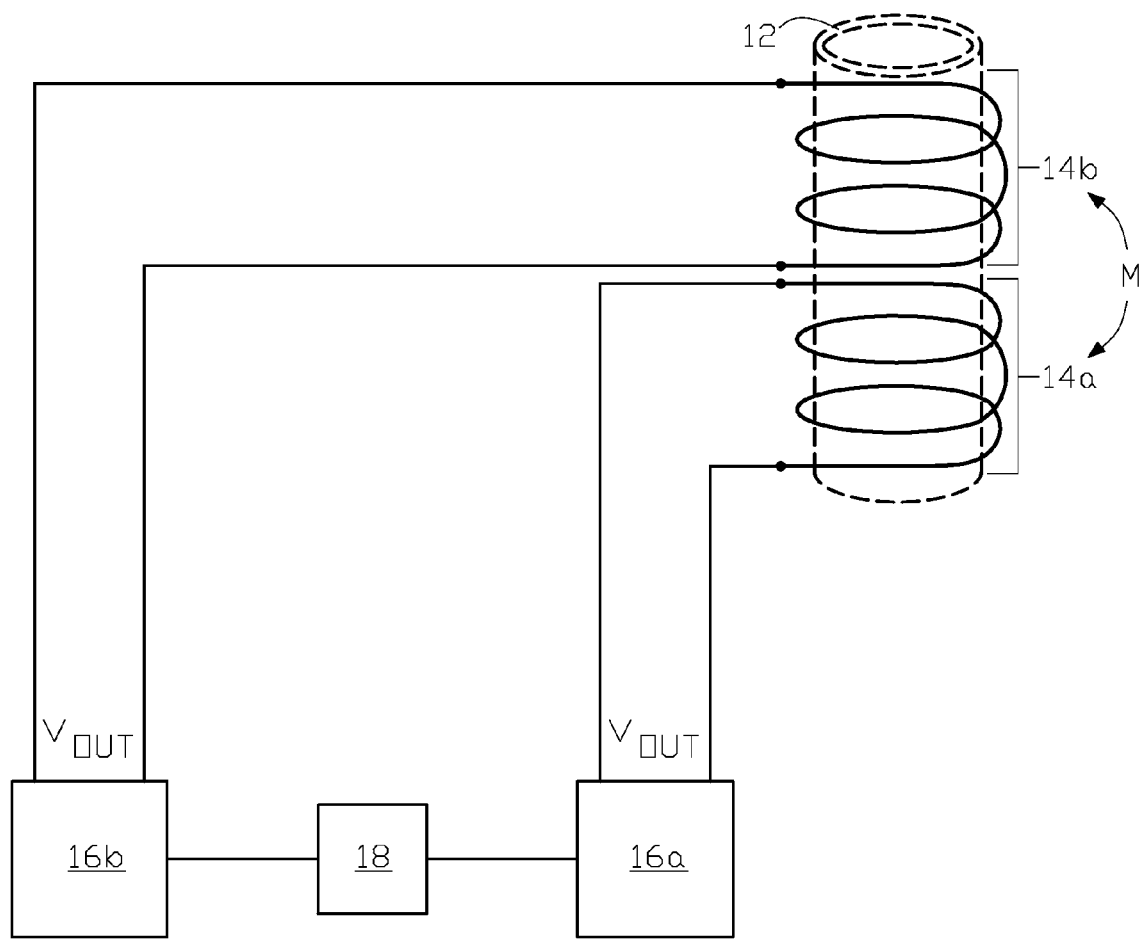
FIG. 1 is a simplified diagram of one example of an electric power system for electric induction heating and melting of materials in a susceptor vessel of the present invention.
Figure 2:
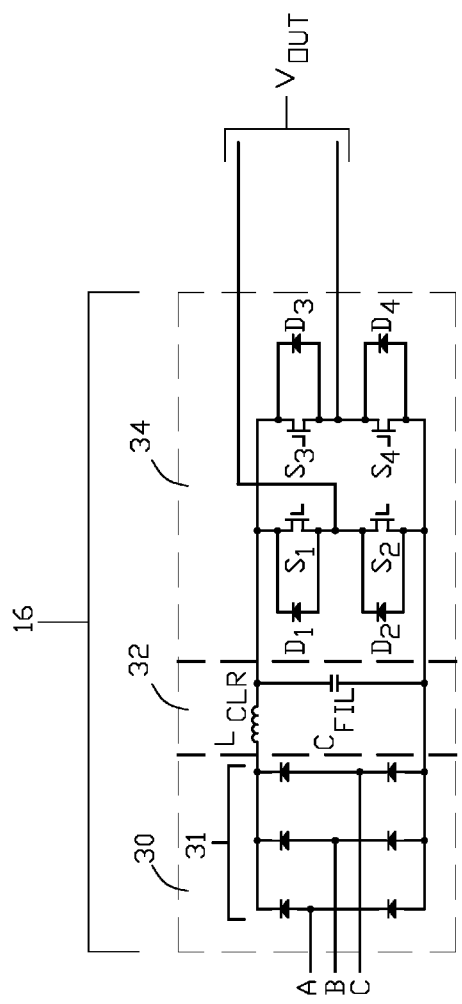
FIG. 2 is a simplified diagram of one example of a power supply used with an electric power system of the present invention as shown in FIG. 1.

FIG. 1 illustrates one non-limiting example of the present invention. The exterior of susceptor vessel 12 (shown in dashed lines) is surrounded by at least two induction coils located in different zones or sections along the height of the vessel. In this example the at least two induction coils are designated lower induction coil 14a and upper induction coil 14b. Separate ac power supplies 16a and 16b have their outputs, $V_{out}$, connected to one of the at least two induction coils as shown in FIG. 1. A suitable, but non-limiting example for each power supply is power supply 16 in FIG. 2. This power supply comprises ac-to-dc-converter section 30, which converts utility power to direct current (dc) power; filter section 32, which filters dc current and/or voltage, and inverter section 34, which synthesizes ac power from the dc power. In this non-limiting example, the converter section comprises full-wave diode bridge rectifier 31; the filter section comprises current limiting reactor $L_{CLR}$ and voltage smoothing capacitor $C_{FIL}$; and the inverter section comprises solid state switches $S_1$, $S_2$, $S_3$, and $S_4$, arranged in a H-bridge configuration, with anti-parallel diodes $D_1$, $D_2$, $D_3$, and $D_4$, to produce ac output voltage, $V_{out}$. Each switch may be any type of circuit switching device, including, for example, an insulated gate bipolar transistor (IGBT) as symbolically shown in FIG. 2. Utility power is typically 50 or 60 Hertz, and in this example, is illustrated as a three phase source designated A, B and C in FIG. 2. Not shown in FIG. 2 is a tuning or impedance matching capacitor that may be provided between the output of the inverter section and the connected induction coil. Also not shown in the figure is a transformer that may be provided between the output of the inverter section and the connected induction coil for load matching purposes.

Preferably, in some examples of the present invention, the generally fixed operating output frequency of the power supplies should be relatively low, for example, in the range from 25 to 70 Hertz, to achieve at least one standard (induced eddy current) depth of penetration into the interior volume formed by the susceptor vessel. The depth of induced eddy current penetration is dependent upon the frequency of the induced eddy current (applied field), and the electrical conductivity and magnetic permeability of the material coupling with the magnetic field. More specifically the depth of induced eddy current penetration ($\delta$) is given by the equation:

$$\delta = 503(\rho/\mu F)^{1/2}$$

where $\rho$ is the electrical resistivity of the material in $\Omega$m; $\mu$ is the relative permeability of the material; and F is the frequency of the induced eddy current resulting from the applied field when the two or more induction coils 14a and 14b are powered from separate power supplies 16a and 16b with an output frequency F.

If the material in the susceptor vessel is non-electrically conductive in the solid state and electrically conductive in the molten state, such as but not limited to silicon (referred to herein as a transition material), even though the fields penetrate into the interior of the vessel, initially only induced heating of the susceptor will occur with the material in the solid state. As the transition material in the crucible proceeds to melt by conduction of heat from the susceptor vessel to the material, the molten and semi-molten transition material will further melt and magnetic flux will inductively couple with the molten material in the vessel.

In the present invention, the output voltage, $V_{OUT}$, of each power supply is phase synchronized by suitable phase synchronization circuitry 18, such as phase locked loop circuitry, and, therefore, is independent of changes in the load impedances (including mutual inductance M between the induction coils) as the state of the transition material changes from solid to molten. Either power supply may function as a master phase controller while the other power supply is slaved to the master controller.

Power magnitude supplied to each induction coil can be controlled by voltage output pulse width control as illustrated, for example, in FIG. 3(a) and FIG. 3(b). As illustrated in FIG. 3(a) the pulse width for the output voltage from power supply 16a to lower induction coil 14a is approximately 90 percent duty cycle, whereas as illustrated in FIG. 3(b) the pulse width for the output voltage from power supply 16b to upper induction coil 14b is approximately 45 percent duty cycle, with both power supplies phase locked at the same operation frequency $f_{op}$. That is, initially the ratio of total power from both supplies to the lower and upper induction coils is 2:1. One non-limiting method of operating the power supplies would be to initially supply a large magnitude of power to the lower induction coil to inductively heat the lower portion of the susceptor vessel when mostly solid transition material is in the vessel until a sufficient quantity of the transition material is melted and becomes electrically conductive. During that transition period, power magnitude to the upper induction coil could be increased and power magnitude to the lower induction coil could be decreased until power output levels from both supplies are equalized (equal ratio of total power to both coils) when all the transition material in the vessel is melted.

Figure 4A:
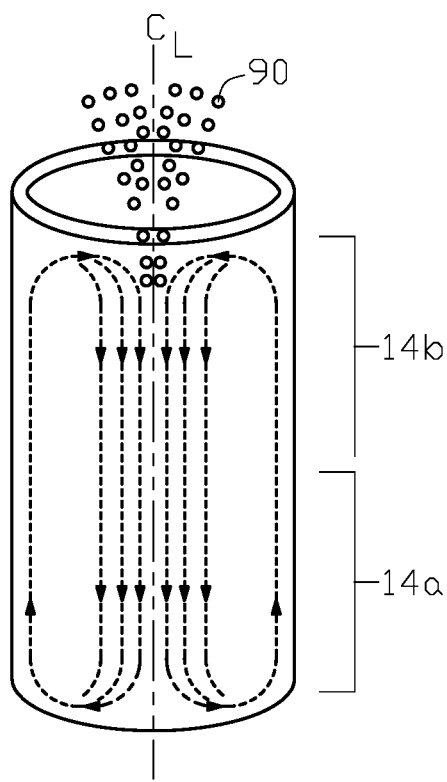
FIG. 4(a) illustrates one pattern of unidirectional electromagnetic stirring achieved with an output voltage phase shift for the power supplies shown in FIG. 1.
Figure 4B:
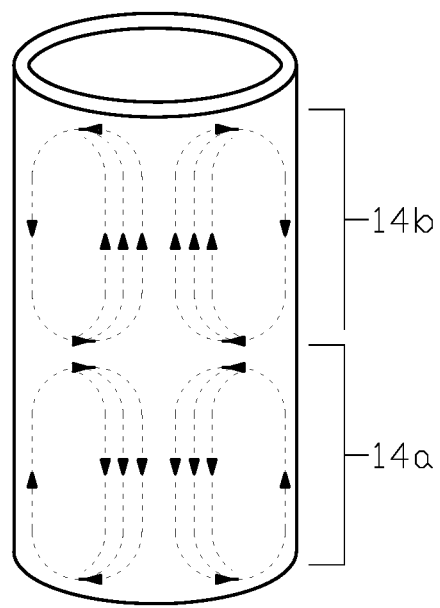
FIG. 4(b) illustrates four loop electromagnetic stirring achieved with phase synchronized and equal magnitude power output from both power supplies shown in FIG. 1.

While some degree of irregularly patterned electromagnetic stirring of molten transition material in the susceptor vessel will occur when unequal power magnitudes are supplied to the upper and lower induction coils, an optional refined and controlled pattern of electromagnetic stirring of the molten transition material in the susceptor vessel may be achieved by providing additional control circuitry to achieve a selectable phase shift between the outputs of the separate power supplies at least somewhere within the range of from plus 90 to minus 90 degrees phase shift to achieve unidirectional electromagnetic stirring as illustrated in FIG. 4(a) rather than four loop electromagnetic stirring as illustrated in FIG. 4(b) when there is no phase shift between the voltages applied to the upper and lower induction coils. The stirring pattern indicated by the arrows in FIG. 4(a) are achieved when voltage applied to the lower induction coil 14a is leading and the voltage applied to the upper induction coil 14b is lagging. The arrangement in FIG. 4(a) is advantageous when adding additional transition material to molten material in the vessel so that the added transition material 90 in the solid state is drawn down in the central region of the melt (about axis $C_L$) where it is rapidly heated and melted. FIG. 5(a) and FIG. 5(b) are representative voltage diagrams with plus and minus 90 degrees phase shift relative to the phase orientation used in FIG. 3(a) and FIG. 3(b).

In other examples of the invention, the operating output frequency of each of the separate power supplies can be variable. For example if the material in susceptor vessel 12 is a transition material, and the susceptor vessel is initially at least partially filled with transition material in the non-electrically conductive solid state, the initial output frequency of each of the separate power supplies can be set to a susceptor inductive heating frequency, which achieves at least one standard depth of penetration into the susceptor material, while the output voltage of each of the separate power supplies is phase synchronized as described above in other examples of the invention. Typically the susceptor inductive heating frequency will be around 1 kHz. Once the solid transition material begins to melt by heat transfer from the heated susceptor material, the output frequency of each of the separate power supplies can be reduced to a molten transition material inductive heating frequency, which achieves at least one standard depth of penetration into the molten transition material in the vessel. Power magnitude supplied to each induction coil can be controlled by voltage output pulse width control as described above for other examples of the invention. Typically the molten transition material inductive heating frequency will be around 100 Hertz. At this point in the process, most of the heating of the transition material is achieved by direct eddy current induction heating of the transition material. Once all of the transition material in the susceptor vessel has been melted, the output frequency of each of the separate power supplies can be lowered to a holding frequency, while the magnitude of power supplied to each induction coil is reduced by voltage output pulse width control as described above in other above examples of the invention, to a holding inductive heating power level, and with a phase shift angle to achieve a desired degree of electromagnetic stirring. In the holding state, which represents holding a substantially full vessel of molten transition material at a selected temperature until molten transition material is drawn from the susceptor vessel, output frequency of each of the separate power supplies, phase shift angle between output voltages of each of the separate power supplies, and output voltage pulse width control of each of the separate power supplies can be adjusted as necessary. For example a processor can execute a computer program for frequency, phase shift and output voltage pulse width control to maintain a molten transition material holding temperature, responsive to an input signal, for example, from a non-contact temperature sensing device that senses the actual temperature of the molten material in the vessel.

As an alternative to drawing molten transition material from the vessel, for example, when the transition material is silicon, the magnitude of electric power to the at least two inductive coils can be sequentially reduced to zero from the bottommost induction coil to the topmost induction coil while sequentially reducing the phase shift to zero (phase synchronized) between the output voltages of the at least two separate power sources to allow the silicon to directionally solidify in the vessel.

The term "susceptor vessel" as used in the present invention includes induction melting vessels or crucibles that comprise one or more discrete susceptor elements distributed about the side or bottom of the vessel or crucible; that is, the entire vessel does not have to be composed of a susceptor material in some examples of the invention.

While the above examples of the invention use two induction coils, more than two induction coils, each connected to a separate power supply, may be utilized in other examples of the invention. At least two adjacent induction coils in these arrangements have applied voltages that are phase synchronized as described above.

An alternative approach to the above examples of the invention is to transform, if necessary, available ac power, for example, 50 or 60 Hertz ac utility power, and supply separate phase synchronized power lines to each of the induction coils. Phase shifting for electromagnetic stirring may be achieved, for example, by providing suitable phase shift circuitry.

The above examples of the invention have been provided for the purpose of explanation, and not limitation of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses such as are within the scope of the appended claims. Those skilled in the art, having the benefit of the teachings of this specification, may effect numerous modifications thereto, and changes may be made without departing from the scope of the invention in its aspects.

The invention claimed is:

1. A method of heating and melting a material in a vessel at least partially comprising a susceptor by supplying an alternating current to at least two induction coils surrounding different sections of the vessel, the method comprising the steps of:
   placing a charge of the material in the vessel;
   supplying the alternating current from a separate power source to each of the at least two induction coils, an output voltage of each of the separate power sources operating with a phase synchronization; and
   varying a magnitude of electric power to each of the at least two induction coils by an independent pulse width control of the output voltage of each of the separate power sources operating with the phase synchronization to heat and melt the material by initially supplying a ratio of at least 2 to 1 of a total power supplied to a bottom one of the at least two induction coils located nearest the bottom of the vessel relative to a top one of the at least two induction coils located nearest the top of the vessel, and decreasing the 2 to 1 ratio of the total power as the material transitions from a solid state to a molten state.

2. The method of claim 1 further comprising the step of establishing a phase shift between the output voltages of at least two of the separate power sources to electromagnetically stir the material in the vessel when the material is in the molten state.

3. The method of claim 1 further comprising the step of varying an output frequency of each of the separate power sources from a susceptor inductive heating frequency when the charge of the material in the vessel is in the solid state and to a charge inductive heating frequency when the charge of the material in the vessel is not in the solid state.

4. A method of heating and melting a transition material in a vessel at least partially comprising a susceptor by supplying an alternating current to at least two induction coils surrounding different sections of the vessel, the method comprising the steps of:
   placing a charge of the transition material in the vessel;
   supplying a fixed frequency output alternating current from a separate power source to each of the at least two induction coils for at least one standard depth of current penetration into the interior volume of the vessel, an output voltage of each of the separate power sources operating with a phase synchronization; and
   varying a magnitude of electric power to each of the at least two induction coils by an independent pulse width control of the output voltage of each of the separate power sources operating with a phase synchronization.

5. The method of claim 4 wherein the step of varying the magnitude of electric power to each of the at least two induction coils further comprises the steps of initially supplying a ratio of at least 2 to 1 of a total power supplied to the one of the at least two induction coils located nearest to the bottom of the vessel relative to the one of the at least two induction coils located nearest to the top of the vessel, and decreasing the ratio of at least 2 to 1 of the total power as the transition material transitions from a non-electrically conductive solid state to an electrically conductive molten state.

6. The method of claim 5 wherein the step of varying the magnitude of electric power to each of the at least two induction coils further comprises supplying an equal ratio of the total power to each of the at least two induction coils when all of the transition material in the vessel is in the electrically conductive molten state.

7. A method of heating and melting a transition material in a vessel at least partially comprising a susceptor by supplying an alternating current to at least two induction coils surrounding different zones of the vessel, the method comprising the steps of:
   placing a charge of the transition material in a solid state in the vessel;
   supplying the alternating current at a susceptor inductive heating frequency from a separate power source to each of the at least two induction coils, an output voltage of each of the separate power sources operating with a phase synchronization, the susceptor inductive heating frequency selected for at least one standard depth of current penetration into the susceptor;
   varying a magnitude of electric power to each of the at least two induction coils by an independent pulse width control of the output voltage of each of the separate power sources operating with the phase synchronization;
   changing the susceptor inductive heating frequency of the alternating current from each of the separate power sources to a molten transition material inductive heating frequency, the molten transition material inductive heating frequency selected for at least one standard depth of current penetration into the transition material in the vessel; and establishing a mix stir phase shift between the output voltages of at least two of the separate power sources to electromagnetically stir the transition material in the vessel as the charge of the transition material transitions from the solid state to a molten state.

8. The method of claim 7 wherein the step of varying the magnitude of electric power to each of the at least two induction coils further comprises the steps of initially supplying a ratio of at least 2 to 1 of a total power supplied to the one of the at least two induction coils located nearest to the bottom of the vessel relative to the one of the at least two induction coils located nearest to the top of the vessel, and decreasing the ratio of at least 2 to 1 of the total power as the transition material transitions from the solid state to the molten state.

9. The method of claim 8 wherein the step of varying the magnitude of electric power to each of the at least two induction coils further comprises supplying an equal ratio of the total power to each of the at least two induction coils when all of the transition material in the vessel is in the molten state.

10. The method of claim 7 further comprising the steps of:
simultaneously reducing the molten transition material inductive heating frequency of the alternating current from each of the separate power supplies to a molten transition material holding stir frequency;
changing the mix stir phase shift to a holding stir phase shift between the output voltages of at least two of the separate power sources; and
reducing the magnitude of electric power to each of the at least two induction coils to a holding stir power magnitude, after all of the charge of the transition material in the vessel is in the molten state, a combination of the molten transition material holding stir frequency, the holding stir phase shift, and the holding stir power magnitude selected to keep the molten state of the transition material at a holding temperature.

11. A method of heating, melting and directionally solidifying a charge of a silicon material in a vessel at least partially comprising a susceptor by supplying an alternating current to at least two induction coils surrounding different sections of the vessel, the method comprising:
placing the charge of the silicon material in the vessel;
supplying the alternating current at a susceptor inductive heating frequency from a separate power source to each of the at least two induction coils, an output voltage of each of the separate power sources operating with a phase synchronization, the susceptor inductive heating frequency selected for at least one standard depth of current penetration into the susceptor;

varying a magnitude of electric power to each of the at least two induction coils by an independent pulse width control of the output voltage of each of the separate power sources to initially supply at least a 2 to 1 ratio of a total power to the one of the at least two induction coils located nearest to the bottom of the vessel relative to the one of the at least two induction coils located nearest to the top of the vessel, and decreasing the 2 to 1 ratio of the total power as the silicon material transitions from a non-electrically conductive solid state to an electrically conductive molten state;

changing the susceptor inductive heating frequency of the alternating current from each of the separate power supplies to a molten silicon inductive heating frequency, the molten silicon inductive heating frequency selected for at least one standard depth of current penetration into the silicon material in the electrically conductive molten state in the vessel; and establishing a phase shift between the output voltages of at least two of the separate power sources to electromagnetically stir the silicon material in the vessel as the silicon material transitions from the non-electrically conductive solid state to the electrically conductive molten state.

12. The method of claim 11 further comprising the step of sequentially reducing the magnitude of electric power to each of the at least two induction coils to zero from the bottommost induction coil to the topmost induction coil while sequentially reducing the phase shift between the output voltages of the at least two of the separate power sources to zero to directionally solidify the silicon material in the electrically conductive molten state from the bottom to the top of the vessel.

* * * * *